United States Patent
Jiang et al.

(10) Patent No.: US 11,253,953 B1
(45) Date of Patent: Feb. 22, 2022

(54) METHOD AND DEVICE FOR PROCESSING UNIDIRECTIONAL FLOW SURFACE

(71) Applicant: BEIJING INSTITUTE OF TECHNOLOGY, Beijing (CN)

(72) Inventors: Lan Jiang, Beijing (CN); Xiaozhe Chen, Beijing (CN); Xin Li, Beijing (CN); Xiaojie Li, Beijing (CN); Misheng Liang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 17/387,662

(22) Filed: Jul. 28, 2021

(30) Foreign Application Priority Data

Apr. 8, 2021 (CN) .......................... 202110379762.7

(51) Int. Cl.
*B23K 26/06* (2014.01)
*B23K 26/362* (2014.01)
*B23K 26/067* (2006.01)

(52) U.S. Cl.
CPC ........ *B23K 26/0648* (2013.01); *B23K 26/067* (2013.01); *B23K 26/362* (2013.01); *B23K 26/0643* (2013.01)

(58) Field of Classification Search
CPC B23K 26/0648; B23K 26/032; B23K 26/067; B23K 26/362; B23K 26/0643
See application file for complete search history.

(56) References Cited

U.S. PATENT DOCUMENTS

| | | | |
|---|---|---|---|
| 6,300,595 B1* | 10/2001 | Williams | B44C 1/228 219/121.68 |
| 2003/0102076 A1 | 6/2003 | Johnston et al. | |
| 2006/0119743 A1* | 6/2006 | Lin | B23K 26/03 348/754 |
| 2013/0337187 A1* | 12/2013 | Reh | B05D 3/06 427/542 |
| 2015/0053289 A1* | 2/2015 | Kurtovic | F15D 1/004 137/814 |
| 2015/0091215 A1* | 4/2015 | Reetz | B29C 59/16 264/400 |

(Continued)

FOREIGN PATENT DOCUMENTS

CN 1928687 A * 3/2007
CN 104439723 A 3/2015

(Continued)

OTHER PUBLICATIONS

Machine translation of CN-1928687A, published Nov. 2021.*

(Continued)

*Primary Examiner* — Geoffrey S Evans
(74) *Attorney, Agent, or Firm* — Brooks Kushman P.C.

(57) ABSTRACT

A method and a device for processing a unidirectional flow surface, the method includes: generating a grayscale map having gradually changed grayscale values; generating a holographic phase map having a bionic light spot with gradually changed energies based on the grayscale map; loading the holographic phase map onto a spatial beam shaper; and focusing a laser beam on a surface of an object to be processed after the laser beam passes through the spatial beam shaper, to process structural units having unidirectional flow characteristics on the surface of the object to be processed.

19 Claims, 3 Drawing Sheets

(56) References Cited

U.S. PATENT DOCUMENTS

2017/0144255 A1* 5/2017 Song .................. B64C 21/10
2021/0208312 A1* 7/2021 Zhang ................. C23C 16/40
2021/0220944 A1* 7/2021 Dallaire .............. B23K 26/046

FOREIGN PATENT DOCUMENTS

| CN | 104625415 A | * | 5/2015 |
| CN | 106735875 A | | 5/2017 |
| CN | 111203651 A | | 5/2020 |
| CN | 112578498 A | | 3/2021 |

OTHER PUBLICATIONS

Machine translation of CN-104625415A, published Nov. 2021.*
Wang et al., "One-step method using laser for large-scale preparation of bionic superhydrophobic & drag-reducing fish-scale surface",Mar. 15, 2021 Science Direct: Surface and Coatings Technology, vol. 409, pp. 1-26.*
First Office Action for Chinese Patent Application No. 202110379762.7, dated Nov. 3, 2021, 16 Pages (including English translation).
Li et al., "Uni-Directional Transportation on Peristome-Mimetic Surfaces for Completely Wetting Liquids," Angew. Chem. Int. Ed., Nov. 21, 2016, pp. 14988-14992, vol. 55, Iss. 48, Wiley-VCH Verlag GmbH & Co., KGaA, Weinheim, Germany (5 Pages).

* cited by examiner

METHOD AND DEVICE FOR PROCESSING UNIDIRECTIONAL FLOW SURFACE

CROSS-REFERENCE TO RELATED APPLICATION

This application claims priority to Chinese Patent Application No. 202110379762.7 filed on Apr. 8, 2021, the content of which is hereby incorporated by reference.

TECHNICAL FIELD

Embodiments of the present disclosure relate to a method and a device for processing a unidirectional flow surface, in particular to a method for processing a unidirectional flow surface based on electronic dynamic regulation and control of spatial shaping.

BACKGROUND

The technology of controlling a micro-nano structure of a material surface to achieve liquid diffusion is widely used. It is a research task to realize flexible manufacturing of a spontaneous liquid transmission surface on a two-dimensional plane and a three-dimensional curved surface of different materials. Liquid flow is the most common phenomenon in nature, and a unidirectional liquid diffusion surface may overcome problems occurred in liquid transmission through gravity and temperature gradient. Therefore, the superior performance of the unidirectional liquid diffusion surface makes it have broad application prospects in the fields of heat and mass transmission, multiphase water collection, liquid transferring, microfluidics, biomedicine, electronic cooling and so on. Structures in nature stimulate a new method for manufacturing the unidirectional liquid diffusion surface. These structures may achieve driving liquid through a surface energy gradient, a capillary force gradient and a Laplace pressure gradient.

SUMMARY

According to at least one embodiment of the present disclosure, there is provided a method for processing a unidirectional flow surface, including: generating a grayscale map having gradually changed grayscale values; generating a holographic phase map having a bionic light spot with gradually changed energies based on the grayscale map; loading the holographic phase map onto a spatial beam shaper; and focusing a laser beam on a surface of an object to be processed after the laser beam passes through the spatial beam shaper, to process structural units having unidirectional flow characteristics on the surface of the object to be processed.

In an exemplary embodiment, the grayscale map includes an image having a shape of the unidirectional flow characteristics.

In an exemplary embodiment, the grayscale map includes an image having anisotropic bionic structures with different eccentric structures.

In an exemplary embodiment, an eccentricity of the grayscale map is determined according to the shape and grayscale values of the grayscale map.

In an exemplary embodiment, the focusing a laser beam on a surface of an object to be processed after the laser beam passes through the spatial beam shaper includes: focusing the laser beam on the surface of the object to be processed through a focusing objective lens after the laser beam passes through the spatial beam shaper.

In an exemplary embodiment, the generating a holographic phase map having a bionic light spot with gradually changed energies based on the grayscale map includes: generating the holographic phase map having the bionic light spot with gradually changed energies based on the grayscale map, according to a local optimization algorithm.

In an exemplary embodiment, the focusing a laser beam on a surface of an object to be processed after the laser beam passes through the spatial beam shaper, to process structural units having unidirectional flow characteristics on the surface of the object to be processed includes: determining processing parameters and processing paths of the laser beam according to the holographic phase map; and processing the structural units having unidirectional flow characteristics on the surface based on the processing parameters and the processing paths of the laser beam.

In an exemplary embodiment, the gradually changed grayscale values include any range from 0 to 255.

In an exemplary embodiment, the quantity of processing pulses of the laser beam is 60 pulses and a scanning speed of the laser beam is 20001 am/s.

In an exemplary embodiment, each structural unit includes a sharp corner portion which is connected with a next structural unit.

In an exemplary embodiment, each structural unit includes a triangular edge structure with sharp corner, and the triangular edge structure has gradient changes inside.

According to at least one embodiment of the present disclosure, there is also provided a device for processing a unidirectional flow surface, including: a femtosecond laser, a spatial beam shaper, the spatial beam shaper is configured to load a holographic phase map having a bionic light spot with gradually changed energies, wherein the holographic phase map is generated based on a grayscale map having gradually changed grayscale values; and the femtosecond laser is configured to generate a laser beam, the laser beam being focused on a surface of an object to be processed after passing through the spatial beam shaper, to process structural units having unidirectional flow characteristics on the surface of the object to be processed.

In an exemplary embodiment, the device further includes an electric control translation stage and a processing control device, the object to be processed is located on the electric control translation stage, and the processing control device is configured to control a movement of the electric control translation stage, to make the femtosecond laser to process the structural units having unidirectional flow characteristics on the surface of the object to be processed.

In an exemplary embodiment, the device further includes a mechanical optical switch, the mechanical optical switch is configured to be turned on or off under the control of the processing control device to adjust the quantity of processing pulses of the laser beam.

In an exemplary embodiment, the processing control device controls the mechanical optical switch, to make the quantity of processing pulses of the laser beam to be 60 pulses and a scanning speed of the laser beam to be 2000 μm/s.

In an exemplary embodiment, the device further includes a Charge Coupled Device (CCD) dynamic imaging device, the CCD dynamic imaging device is configured to dynamically image the object to be processed.

In an exemplary embodiment, the device further includes a focusing lens and a beam expanding lens, the focusing lens focuses the laser beam passing through the mechanical optical switch, and the beam expanding lens expands a focused laser beam.

In an exemplary embodiment, the device further incudes a reflector and a focusing objective lens, the reflector reflects the laser beam passing through the beam expanding lens, and the focusing objective lens focuses a reflected laser beam.

In an exemplary embodiment, each structural unit has a sharp corner portion which is connected with a next structural unit.

In an exemplary embodiment, each structural unit comprises a triangular edge structure with sharp corner, and the triangular edge structure has gradient changes inside.

BRIEF DESCRIPTION OF DRAWINGS

FIG. 3A is an array diagram of a functionality surface structure of a processed sample, FIG. 3B is a sectional view of a single structural unit, and FIG. 3C is an enlarged view of a structure in a circle position in FIG. 3B.

Figure 1:
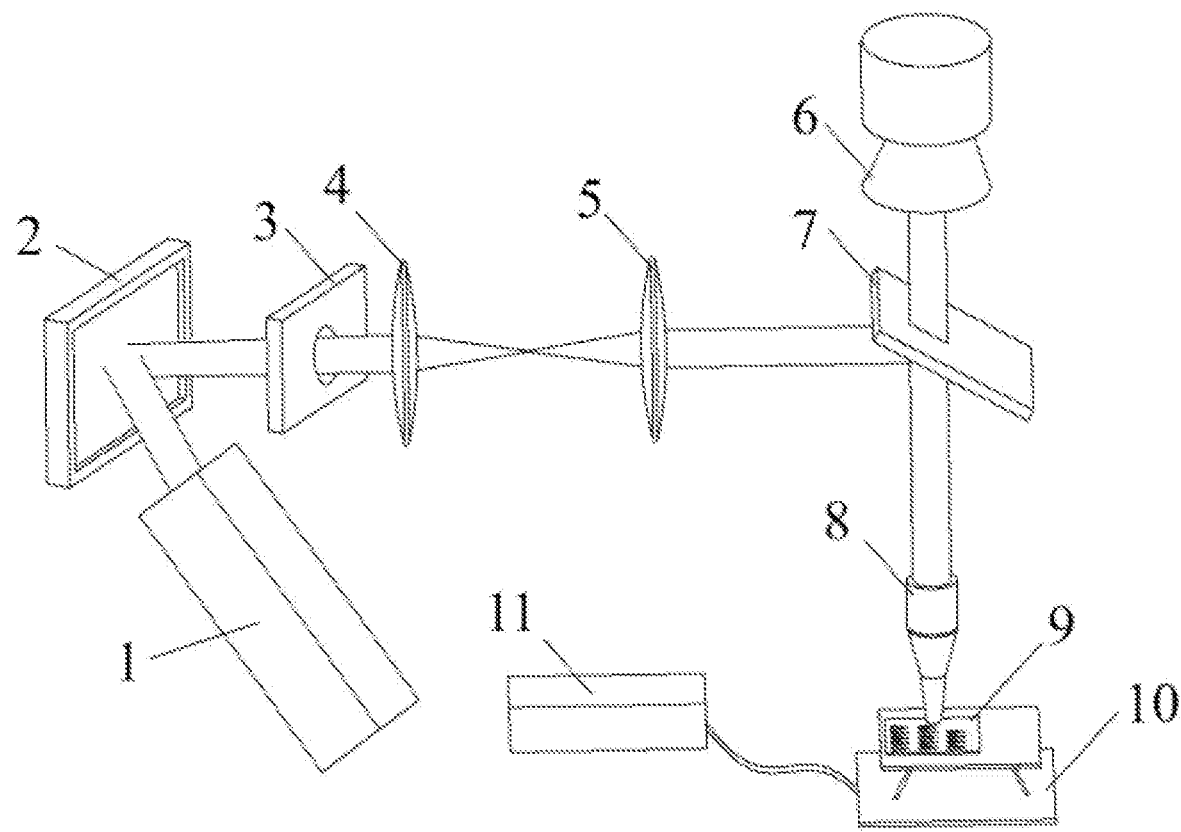
FIG. 1 illustrates a schematic diagram of an optical path of a femtosecond laser spatial shaping processing system according to an embodiment of the present disclosure.

Among them, 1 indicates a femtosecond laser, 2 indicates a spatial optical shaper, 3 indicates a mechanical optical switch, 4 indicates a 4*f* focusing lens, 5 indicates a 4*f* beam expanding lens, 6 indicates an ultrafast reflector, 7 indicates a focusing objective lens, 8 indicates a sample to be processed, 9 indicates a Charge Coupled Device (CCD) dynamic imaging unit, 10 indicates electric control translation stage, and 11 indicates a precision processing control device.

DETAILED DESCRIPTION

In order to make the technical means, creative features, objects and effects achieved by the present disclosure easy to understand clearly, the present disclosure will be further explained in conjunction with specific embodiments and drawings.

Surface activity and micro-nano multi-level structure are two main factors affecting the functionality surface properties, especially micro-nano multi-level structure may endow a material surface with thermo-electromagnetic properties and unique optical and mechanical properties. In addition, the multi-level structure is of great significance to a bionic material surface in reducing friction resistance, providing a new energy source, and achieving controllable transportation of micro-fluids. Some biological surface structures, such as nepenthes, butterfly wings and desert beetles, may achieve the unidirectional flow of liquid. Various methods for processing a functionality bionic surface to control the unidirectional movement of liquid have been developed. These processing methods have some limitations: (1) Since masks are needed for processing, a processing cost of studying various bionic structures is high. (2) Due to the limitations of UV curing, high-resolution stereolithography, micro-imprinting and other processing ways, the processed materials are mostly organic materials, so an application environment of a resulting device by processing is not extensive. (3) It is difficult to process a three-dimensional adjustable structure directly on a spatial curved surface. These problems affect practical application of the unidirectional liquid diffusion technology.

The present disclosure proposes a flexible three-dimensional maskless manufacturing method for a bionic unidirectional liquid diffusion surface. In this method, the femtosecond laser light field is transformed from a Gaussian distribution to three-dimensional bionic light field distribution by using a spatial light phase shaping method, so a anisotropic bionic structure processing may be achieved on various solid materials, and anisotropic structures include various asymmetric structures such as a double-layer structure, a gradient structure, a patterned structure and an orientation structure. The anisotropic bionic structure may control a direction of liquid flow, use a spatial light modulator (SLM) to perform phase transformation on a Gaussian beam, and may control a three-dimensional distribution of output energy of the femtosecond laser to obtain different anisotropic bionic spatial light fields. The anisotropic bionic structure includes a sharp triangle edge, a height gradient change and a continuous uniform functionality surface of a single structure. This method may further expand applications of the femtosecond laser micro-processing in fog collection, chemical reaction control and other fields.

In a method for processing a unidirectional flow surface based on electronic dynamic regulation and control of spatial shaping according to the present application, compared with other processing methods, a femtosecond laser processing method may form a anisotropic bionic structure on various solid materials and expand application range.

In a method for processing a unidirectional flow surface based on electronic dynamic regulation and control of spatial shaping according to the present application, a large number of internal capillary structures such as pore columns are synchronously obtained in a processing procedure, so that the absorption of liquid is facilitated, and the liquid flow is accelerated.

In a method for processing a unidirectional flow surface based on electronic dynamic regulation and control of spatial shaping according to the present application, a processing procedure is simple, no mask is required, and a result is reliable, which may achieve any patterned bionic structure array processing and may flexibly adjust processing effects.

Figure 4:
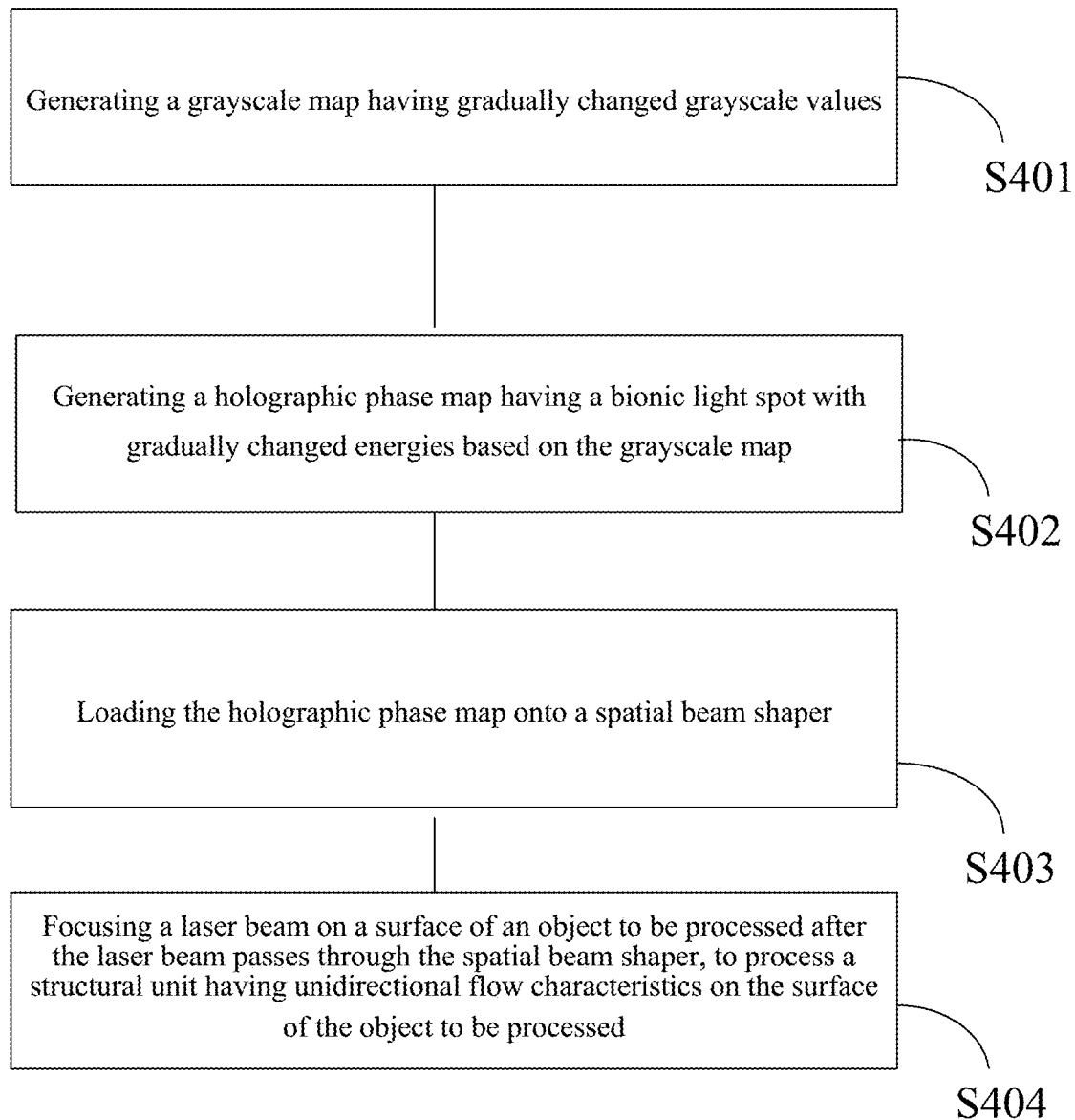
FIG. 4 illustrates a method of processing a unidirectional flow surface according to an embodiment of the present disclosure.

FIG. 4 illustrates a method of processing a unidirectional flow surface according to an embodiment of the present disclosure, for example, a method of processing a unidirectional flow surface based on electronic dynamic regulation and control of spatial shaping. Referring to FIG. 4, the method of processing the unidirectional flow surface according to the embodiment of the present disclosure may include the following steps.

At step S401, a grayscale map having gradually changed grayscale values is generated.

At step S402, a holographic phase map having a bionic light spot with gradually changed energies is generated based on the grayscale map.

At step S403, the holographic phase map is loaded onto a spatial beam shaper.

At step S404, a laser beam is focused on a surface of an object to be processed after passing through the spatial beam shaper, to process a structural unit having unidirectional flow characteristics on the surface of the object to be processed.

In an example, a femtosecond laser is used to emit the laser beam, and parameters of the femtosecond laser may be: for example, a femtosecond laser system may be a laser produced by American Spectral Physics Company, and the laser beam is linearly polarized, with a central wavelength of 800 nm, a pulse width of 35 fs, and a repetition frequency of 1 kHz; in an experiment, the sample to be processed is, for example, metallic silicon, with a size of 10 mm×10 mm×0.5 mm.

The unidirectional flow surface obtained by processing the object to be processed based on electronic dynamic regulation and control of spatial shaping may include a plurality of structural units, and a sharp corner portion of each unit is connected with a next unit. For example, the unit is a triangular edge structure with sharp corners, and the structure has gradient changes inside.

According to at least one embodiment of the present disclosure, there is also provided a device for processing a unidirectional flow surface, as shown in FIG. 1, which includes a femtosecond laser 1 and a spatial beam shaper 2. The spatial beam shaper 2 is configured to load a holographic phase map having a bionic light spot with gradually changed energies, the holographic phase map is generated based on a grayscale map having gradually changed grayscale values. The femtosecond laser 1 is configured to generate a laser beam, which is focused on a surface of an object to be processed after passing through the spatial beam shaper, to process a structural unit having unidirectional flow characteristics on the surface of the object to be processed.

In another embodiment, as shown in FIG. 1, a device for processing a unidirectional flow surface, such as a femtosecond laser spatial beam shaping system, may further include a femtosecond laser 1, a spatial beam shaper 2, a mechanical optical switch 3, a 4f focusing lens 4, a 4f beam expanding lens 5, an ultrafast reflector 6, a focusing objective lens 7, a sample to be processed 8, and a CCD dynamic imaging unit 9. A laser beam emitted by femtosecond laser 1 enters the spatial beam shaper 2, is reflected by a liquid crystal screen of the spatial beam shaper 2, transmitted via the mechanical optical switch 3, the 4f focusing lens 4 and the 4f beam expanding lens 5, then reflected by the ultrafast reflector 6, and focused on the sample 8 to be processed on a precision electric control translation stage 10 via the focusing objective lens 7. An illumination beam emitted by the uppermost CCD dynamic imaging unit 9 irradiates the sample 8 to be processed after passes through the ultrafast reflector 6 and the focusing objective lens 7. The illumination beam then is reflected by the sample 8, and the reflected light returns to the CCD dynamic imaging unit 9 via the focusing objective lens 7 and the ultrafast reflector 6 again. A processing control device 11, such as a computer, may be connected with the mechanical optical switch 3 and the precision electric control translation stage 10, to control turn-on and turn-off time of the mechanical optical switch 3 to adjust the quantity of pulses for processing a single bionic structure. In addition, the processing control device 11 may further control a movement of the precision electric control translation stage 10, to make it move in the X, Y or Z axis direction. The movement meets a preset speed and position required for use, and the processing control device 11 may be connected with the CCD dynamic imaging unit 9 to monitor the processing of the surface of the sample.

Embodiment 1

In an embodiment, a method of processing a unidirectional flow surface based on electronic dynamic regulation and control of spatial shaping may include the following steps.

At step 1, as shown in FIG. 1, a femtosecond laser system uses a spatial beam shaper to generate different anisotropic bionic spatial light fields, such as bionic gradient light fields. The designed bionic gradient light field is processed through control.

Figure 2:
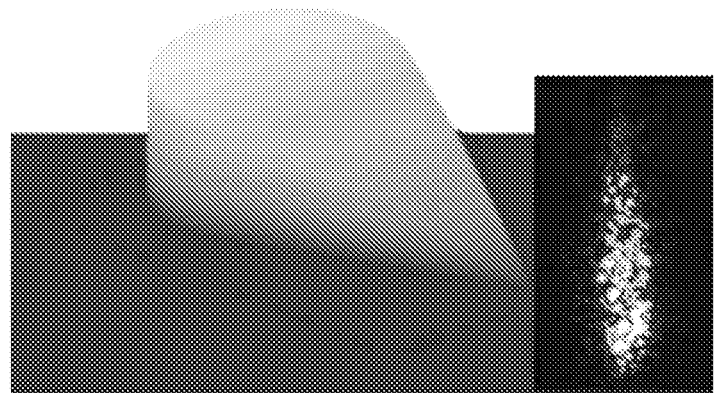
FIG. 2 illustrates a schematic diagram of an energy distribution of a shaping light spot in a method for processing a unidirectional flow surface based on electronic dynamic regulation and control of spatial shaping.

At step 2, as shown in FIG. 2, a designed grayscale map having a bionic moss root shape and a gradually changed grayscale of 10:5 is shown. A holographic phase map corresponding to the grayscale map may be generated based on the grayscale map by using a local optimization algorithm. For example, a Gerchberg-Saxton algorithm (i.e., GS algorithm) is used to generate the corresponding holographic phase map.

At step 3, the holographic phase map obtained in step 2 is loaded into a spatial beam shaper 2, and through a liquid crystal screen of the spatial beam shaper 2, a femtosecond laser beam is reflected to an focusing lens 4 etc. for being focused, and the laser beam is focused on a surface of a processed sample by adjusting related components.

At step 4, appropriate processing speed and energy are selected to process a surface of a material by controlling a movement track of the sample by the processing control device 11.

Figure 3A:
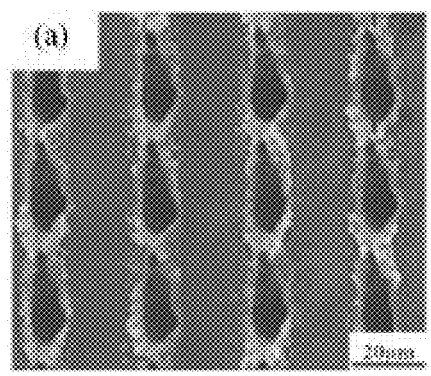
FIG. 3A to FIG. 3C illustrate a schematic diagram of a processing structure of a method for processing a unidirectional flow surface based on electronic dynamic regulation and control of spatial shaping according to an embodiment of the present disclosure.
Figure 3B:
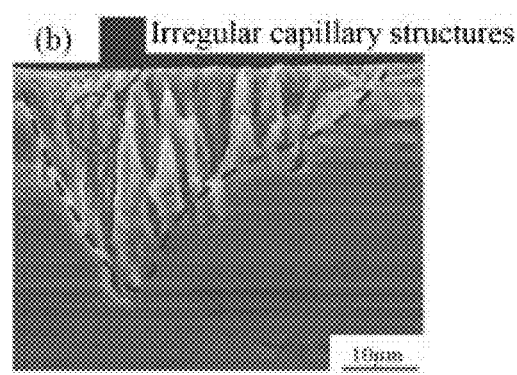
Figure 3C:
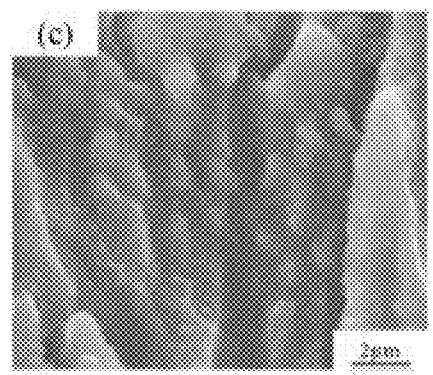

At step 5, as shown in FIG. 3A to FIG. 3C, FIG. 3A is an array diagram of a functionality surface structure on a surface of a processed sample. As shown in FIG. 3A, the functionality surface structure includes many structural units which are connected end to end, so that water may be transmitted through a stepped structure. FIG. 3B is a sectional view of a single structural unit, which shows an asymmetric eccentric structure having micron pores inside. FIG. 3C is an enlarged view of a structure in a circle position in FIG. 3B, it can be seen that there are many micropores and irregular structures inside, which may increase the absorption of water. For example, the processed surface is ultrasonically cleaned with alcohol, and 0.1-1 µL droplets are dropped on the processed surface, and a fluidity test is carried out on the flow effect of the droplets. For example, when 0.5 µL and 1 µL droplets are dropped, test flow lengths are about 5.75 mm and 16 mm, respectively. A 0.5 µL droplet may flow to 3.17 mm in 440 ms, and to 4.25 mm in 1040 ms.

It can be seen from the embodiment of the present disclosure that the method for processing the unidirectional flow surface based on electronic dynamic control spatial shaping is simple in processing procedure, reliable in result, capable of achieving arbitrary patterning processing and flexibly adjusting the processing effect.

Embodiment 2

In an example, parameters of an adopted femtosecond laser may be: for example, a femtosecond laser system may be a laser produced by American Spectral Physics Company, and the adopted laser beam is linearly polarized, with a central wavelength of 800 nm, a pulse width of 35 fs, and a repetition frequency of 1 kHz; in an experiment, the sample to be processed is metallic silicon, with a size of 10 mm×10 mm×0.5 mm.

The unidirectional flow surface processed based on electronic dynamic regulation and control of spatial shaping may include a plurality of structural units, and a sharp corner portion of each unit is connected with a next unit. The unit is a triangular edge structure with sharp corners, and the structure has gradient changes inside.

A method for processing a unidirectional flow surface based on electronic dynamic regulation and control of spatial shaping includes the following steps.

At step 1, as shown in FIG. 1, a femtosecond laser system uses a spatial beam shaper to generate different anisotropic bionic spatial light fields. The designed bionic gradient light field is processed through control.

At step 2, as shown in FIG. 2, it is different from Embodiment 1 in that, a designed image having a bionic moss root shape is a grayscale map having a gradually changed grayscale of 10:1. A local optimization algorithm (for example, a GS algorithm) may be used to generate a corresponding holographic phase map based on the grayscale map.

At step 3, the holographic phase map obtained in step 2 is loaded into a spatial beam shaper 2, and a femtosecond laser beam is reflected to a focusing objective lens through a liquid crystal screen of the spatial beam shaper 2, is focused via the focusing objective lens, and the laser beam is focused on a surface of a processed sample by adjusting related components.

At step 4, a movement track of the sample is controlled by a processing control device 11 such as a computer, and appropriate processing speed and energy are selected to process a surface of a material.

At step 5, as shown in FIG. 3A to FIG. 3C, FIG. 3A is an array diagram of a functionality surface structure on a surface of a processed sample. The functionality surface structure includes many structural units which are connected end to end, so that water may be transmitted through a stepped structure. FIG. 3B is a sectional view of a single structural unit, which shows an asymmetric eccentric structure having micron pores inside. FIG. 3C is an enlarged view of a structure in a circle position in FIG. 3B, it can be seen that there are many micropores and irregular structures inside, these structures may increase the absorption of water. The processed surface is ultrasonically cleaned with alcohol, and 0.1-1 μL droplets are dropped on the processed surface, and a test is carried out on the flow effect of the droplets.

It can be seen from the embodiment of the present disclosure that the method for processing the unidirectional flow surface based on electronic dynamic control spatial shaping is simple in processing procedure, reliable in result, capable of achieving arbitrary patterning processing and flexibly adjusting the processing effect.

Embodiment 3

In an embodiment, parameters of an adopted femtosecond laser may be: a femtosecond laser system may be a laser produced by American Spectral Physics Company, and the adopted laser beam is linearly polarized, with a central wavelength of 800 nm, a pulse width of 35 fs, and a repetition frequency of 1 kHz; in an experiment, the sample to be processed is metallic silicon, with a size of 10 mm×10 mm×0.5 mm.

The unidirectional flow surface processed based on electronic dynamic regulation and control of spatial shaping may include a plurality of structural units, and a sharp corner portion of each unit is connected with a next unit. The unit is a triangular edge structure with sharp corners, and the structure has gradient changes inside.

A method for processing a unidirectional flow surface based on electronic dynamic regulation and control of spatial shaping includes the following steps.

At step 1, as shown in FIG. 1, a femtosecond laser system uses a spatial beam shaper to generate different anisotropic bionic spatial light fields. The designed bionic gradient light field is processed through control.

At step 2, as shown in FIG. 2, it is different from above Embodiments in that, a designed grayscale map may have nepenthes leaf shape and a gradually changed grayscale of 10:1, a GS algorithm may be used to generate a corresponding holographic phase map.

At step 3, the holographic phase map obtained in step 2 is loaded into a spatial beam shaper 2, and a femtosecond laser beam is reflected through a liquid crystal screen of the spatial beam shaper 2, is focused via an objective lens, and the laser beam is focused on a surface of a processed sample by adjusting related components.

At step 4, a movement track of the sample may be controlled by a processing control device 11 such as a computer, appropriate processing speed and energy are selected to process a surface of a material.

At step 5, as shown in FIG. 3A to FIG. 3C, FIG. 3A is an array diagram of a functionality surface structure on a surface of a processed sample. The functionality surface structure includes many structural units which are connected end to end, so that water may be transmitted through a stepped structure. FIG. 3B is a sectional view of a single structural unit, which shows an asymmetric eccentric structure having micron pores inside. FIG. 3C is an enlarged view of a structure in a circle position in FIG. 3B, it can be seen that there are many micropores and irregular structures inside, these structures may increase the absorption of water. The processed surface is ultrasonically cleaned with alcohol, and 0.1-1 μL droplets are dropped on the processed surface, and a test is carried out on the flow effect of the droplets.

It can be seen from the embodiment of the present disclosure that the method for processing the unidirectional flow surface based on electronic dynamic control spatial shaping is simple in processing procedure, reliable in result, capable of achieving arbitrary patterning processing and flexibly adjusting the processing effect.

The above specific description further explains objects, technical solutions and beneficial effects of the present disclosure. It should be understood that the above description is only a specific embodiment of the present disclosure and is not used to limit the protection scope of the present disclosure. Any modification, equivalent substitution and improvement made within the spirit and principle of the present disclosure should be included in the protection scope of the present disclosure.

What is claimed is:

1. A method for processing a unidirectional flow surface, comprising:
   generating a grayscale map having gradually changed grayscale values, the grayscale map comprising an image having anisotropic bionic structures;
   generating a holographic phase map having a light spot with gradually changed energies based on the grayscale map, according to a Gerchberg-Saxton algorithm;
   loading the holographic phase map onto a spatial beam shaper; and
   focusing a laser beam on a surface of an object to be processed after the laser beam passes through the spatial beam shaper, to process structural units having unidirectional flow characteristics on the surface of the object to be processed.

2. The method of processing a unidirectional flow surface according to claim 1, wherein the grayscale map comprises an image having a shape of the unidirectional flow characteristics.

3. The method for processing a unidirectional flow surface according to claim 2, wherein the anisotropic bionic structures have different eccentric structures.

4. The method for processing a unidirectional flow surface according to claim 3, wherein an eccentricity of the grayscale map is determined according to the shape and grayscale values of the grayscale map.

5. The method for processing a unidirectional flow surface according to claim 1, wherein focusing the laser beam on the surface of an object to be processed after the laser beam passes through the spatial beam shaper comprises:
   focusing the laser beam on the surface of the object to be processed through a focusing objective lens after the laser beam passes through the spatial beam shaper.

6. The method for processing a unidirectional flow surface according to claim 1, wherein focusing the laser beam on the surface of the object to be processed after the laser beam passes through the spatial beam shaper, to process the structural units having unidirectional flow characteristics on the surface of the object to be processed comprises:
   determining processing parameters and processing paths of the laser beam according to the holographic phase map; and
   processing the structural units having unidirectional flow characteristics on the surface based on the processing parameters and the processing paths of the laser beam.

7. The method for processing a unidirectional flow surface according to claim 1, wherein the gradually changed grayscale values comprise any range from 0 to 255.

8. The method for processing a unidirectional flow surface according to claim 1, wherein a quantity of processing pulses of the laser beam is 60 pulses and a scanning speed of the laser beam is 2000 μm/s.

9. The method for processing a unidirectional flow surface according to claim 1, wherein each structural unit comprises a sharp corner portion which is connected with a next structural unit.

10. The method for processing a unidirectional flow surface according to claim 9, wherein each structural unit comprises a triangular edge structure with sharp corner, and the triangular edge structure has gradient changes inside.

11. A device for processing a unidirectional flow surface, comprising:
   a femtosecond laser, a spatial beam shaper,
   the spatial beam shaper is configured to load a holographic phase map having a light spot with gradually changed energies, wherein the holographic phase map is generated based on a grayscale map having gradually changed grayscale values and comprising an image having anisotropic bionic structures, according to a Gerchberg-Saxton algorithm; and
   the femtosecond laser is configured to generate a laser beam, the laser beam being focused on a surface of an object to be processed after passing through the spatial beam shaper, to process structural units having unidirectional flow characteristics on the surface of the object to be processed.

12. The device for processing a unidirectional flow surface according to claim 11, further comprising an electric control translation stage and a processing control device,
   the object to be processed is located on the electric control translation stage, and the processing control device is configured to control a movement of the electric control translation stage, to make the femtosecond laser to process the structural units having unidirectional flow characteristics on the surface of the object to be processed.

13. The device for processing a unidirectional flow surface according to claim 12, further comprising a mechanical optical switch,
   the mechanical optical switch is configured to be turned on or off under control of the processing control device to adjust a quantity of processing pulses of the laser beam.

14. The device for processing a unidirectional flow surface according to claim 13, wherein
   the processing control device controls the mechanical optical switch, to make the quantity of the processing pulses of the laser beam to be 60 pulses and a scanning speed of the laser beam to be 2000 μm/s.

15. The device for processing a unidirectional flow surface according to claim 14, further comprising a focusing lens and a beam expanding lens,
   the focusing lens focuses the laser beam passing through the mechanical optical switch, and the beam expanding lens expands a focused laser beam.

16. The device for processing a unidirectional flow surface according to claim 15, further comprising a reflector and a focusing objective lens,
   the reflector reflects the laser beam passing through the beam expanding lens, and the focusing objective lens focuses the reflected laser beam.

17. The device for processing a unidirectional flow surface according to claim 11, further comprising a Charge Coupled Device (CCD) dynamic imaging device,
   the CCD dynamic imaging device is configured to dynamically image the object to be processed.

18. The device for processing a unidirectional flow surface according to claim 11, wherein each structural unit has a sharp corner portion which is connected with a next structural unit.

19. The device for processing a unidirectional flow surface according to claim 18, wherein each structural unit comprises a triangular edge structure with sharp corner, and the triangular edge structure has gradient changes inside.

* * * * *